Dec. 30, 1930. 1,786,418
P. BAQUEY, OTHERWISE KNOWN AS G. BAQUEY
FACE PAINT OR FARD DISTRIBUTOR WITH STUMP
Filed July 2, 1929
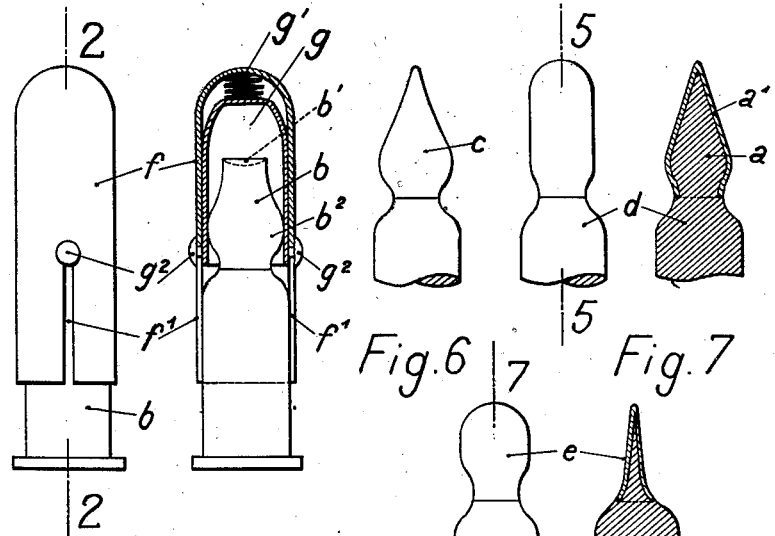
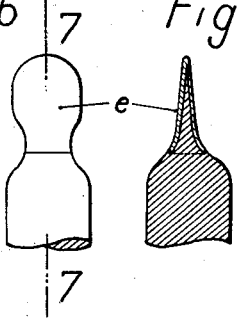
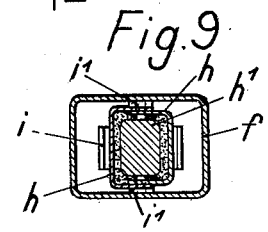
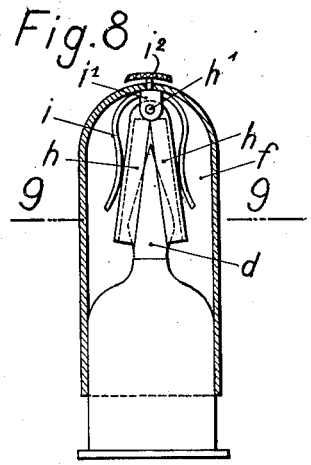
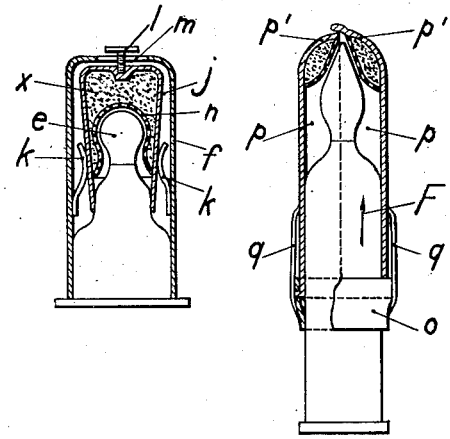

Patented Dec. 30, 1930

1,786,418

UNITED STATES PATENT OFFICE

PIERRE BAQUEY, OTHERWISE KNOWN AS GASTON BAQUEY, OF COLOMBES, FRANCE

FACE PAINT OR FARD DISTRIBUTOR WITH STUMP

Application filed July 2, 1929, Serial No. 375,490, and in Luxemburg July 5, 1928.

The present invention has for its object a face paint or fard distributor with stump.

This distributor is characterized in that it comprises a stump the shape of which is suited to the use for which it is intended, this stump forming the body of the device, and being covered with a movable cap in which is suitably placed fard, in the form of a suitable product, solid, pasty or pulverulent for instance, and in such manner that this fard can come into contact with the operative portion of the stump, owing to a suitable movement, for instance either by penetration and rotation of the stump in the fard, or by oscillation of one of the two parts, fard or stump, on the other.

By means of this distributor, the stump, being made of a sufficiently rigid material, wood or plastic material, for instance, is used, after impregation with fard in the cap, as an ordinary fard stick, but with this advantage, that this stump does not lose its initial shape, as it happens with an ordinary fard stick.

The rigid material of the stump is preferably enclosed in a covering of soft material which can be easily impregnated with fard, such as chamois leather, a suitable fabric or the like.

An improvement lies in that the fard is contained in an interchangeable cup, either fixed or capable of rocking in the bottom of the cap, this cup being made either in one piece and then forms a bowl, or of two longitudinal shells hinged together and constituting jaws, one or more springs tending to close these jaws one against each other, which jaws can constitute the upper part of the cap.

Owing to these interchangeable cups, it is possible, when the fard is used up, to replace the empty cup by a full one.

An improvement of a stump particularly intended for the application of fard on the lips, consists in that the operative portion of this stump presents approximately the appearance of a truncated cone, the small base of which cone being slightly concave, so as to fit the rounded shape of the lips better.

The invention is, moreover, characterized by the general and detail arrangements indicated in the forms of construction described and illustrated by way of examples in the accompanying drawing in which:

Figs. 1 and 2 are an elevation and a longitudinal section made according to line 2—2 of Fig. 1, showing a fard distributor in accordance with the invention.

Figs. 3, 4 and 5, 6 and 7, illustrate three modifications of stumps.

Fig. 8 shows a distributor with a cup constituted by jaws.

Fig. 9 is a section thereof, made according to line 9—9 of Fig. 8.

Fig. 10 shows a fard distributor having a rocking cup.

Fig. 11 shows a distributor with a cap which opens.

In these examples, the stumps are constituted by a body $a$ (Fig. 5) made of rigid material, wood or the like, covered with a soft material $a^1$, chamois leather, or the like.

The stump $b$ (Fig. 2) is approximately in the shape of a truncated cone with an end cup $b^1$.

The stump $c$ (Fig. 3) is approximately conical; the stump $d$ (Figs. 4 and 5) is wedge-shaped; the stump $a$ (Figs. 6 and 7) has the shape of a thin blade.

In Figs. 1 and 2, the stump $b$ slides in a cap $f$, in the bottom of which is arranged a cup $g$ containing the face paint or fard. A spring $g^1$ is interposed between the bottom of the cup $g$ and the cap $f$. The face paint or fard (not shown) is of a solid, pasty or pulverulent nature; in the latter case, the make-up powder is arranged in one or more sachets acting as a sieve; these sachets are secured in the cup, by pasting for instance, so that the stump can enter between them and become impregnated with powder. The enlarged portion $b^2$ of the stump obturates the cup $g$. The latter is provided with two knobs $g^2$ which, sliding in two slots $f^1$ of the cap, secure the cup and allow its removal when the fard has been used up.

In Figs. 8 and 9, the fard-carrying cup is constituted by two jaws $h$, of trough shape, pivoted on a pin $h^1$ passing through the two cheeks $i^1$ of a spring $i$, the branches of which tend to press the jaws $h$ one against the other. The spring $i$ is secured, in an interchangeable manner, against the bottom of the cap *f* by a screw *i*² having a milled head. The fard or face paint is arranged in the troughs of the jaws *h*, either in a solid, pasty or pulverulent condition; in the latter case, this powder is enclosed in sachets-sieves attached in the troughs.

For use, the stump *d* is driven between the jaws *h*, which move apart in order to allow its passage and its friction against the fard.

In Fig. 10 the cup *j* is held, on the one hand, between two side springs *k* secured to the cap *f* and, on the other hand, at the bottom of the latter by means of a screw *l* passing through a long aperture *m* formed in the cap. This example shows fard in powder form *x* contained in a satchet-sieve *n* secured in the cup *g* and allowing the insertion of the stump *e* between its walls. It is possible to replace this fard in powder form by fard in a pasty or solid condition, in which is provided a space for initially receiving the stump.

For use, before removing the stump from the cap, the cup *j* can be caused to rock by a to-and-fro movement imparted to the knob *l* owing to the slot *m*. This movement facilitates the deposition of the fard on the stump.

In Fig. 11 the stump slides in a ring on which are pivoted the bases of two shells *p* constituting the cap by their junction. These shells are held in closed position by two springs *q* rigid with the ring *o*. The fard is placed in the cups *p*¹ either as a powder placed in sachets-sieves, or in a pasty or solid condition.

For use, it suffices to push the stump in the direction of the arrow F. This stump, sliding in the ring *o*, rubs against the fard and issues from the cap, the shells of which open under the pressure of the stump.

It is to be understood that the means for causing the stump to move upwards and to slide in the cap can be of any type; thus, concerning stumps having a surface of revolution, these latter can be combined with a helical rising device.

The forms and accessory arrangements of the various parts of the device described, the dimensions, constituent materials and constructional details and means, may be varied without departing thereby from the scope of the present invention.

I claim:

1. In a face paint or fard distributor with stump, the combination of a body carrying the stump, a cap adapted to slidably fit on the said body and to cover the said stump, a removable paint-holder in the said cap, this paint-holder containing a small mass of face paint arranged for coming in contact with the said stump.

2. In a face paint or fard distributor with stump, the combination of a body carrying the stump, a cap adapted to slidably fit on the said body and to cover the said stump, a removable cover in the said cap and open on the side of the latter having an opening, this cover containing a small mass of face paint and being fitted in the said cap so that it can be easily withdrawn.

3. In a face paint or fard distributor with stump, the combination of a body carrying the stump, a cap adapted to slidably fit on the said body and to cover the said stump, and the removable paint-holder in the said cap and constituted by a pin removably secured at the bottom of the said cap, two jaws pivoted on the said pin and each containing a small mass of face paint, a spring adapted to press the said jaws against each other, the arrangement being such that the said stump may enter between the said jaws.

4. In a face paint or fard distributor with stump, the combination of a body carrying the stump, a cap adapted to slidably fit on the said body and to cover the said stump, a removable cup in the said cap and open on the side of the latter having an opening, two side fixed springs in the said cap and adapted to hold the said cup, a screw screwed in the bottom of the said cup and fitted in the bottom of the said cap, a sachet-sieve in the said cup for containing face paint in powder form, the arrangement being such that the said stump may enter the said cup.

In testimony whereof I have hereunto affixed my signature.

PIERRE BAQUEY, dit GASTON BAQUEY.